United States Patent
Amanullah (10) Patent No.: US 10,240,411 B1
(45) Date of Patent: Mar. 26, 2019

(54) TRIMODAL HYBRID LOSS PREVENTION MATERIAL (LPM) FOR PREVENTATIVE AND CURATIVE LOSS CONTROL

(71) Applicant: Saudi Arabian Oil Company, Dhahran (SA)

(72) Inventor: Md Amanullah, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/928,979

(22) Filed: Mar. 22, 2018

(51) Int. Cl.
| E21B 21/00 | (2006.01) |
| C09K 8/20 | (2006.01) |
| C09K 8/24 | (2006.01) |
| C09K 8/32 | (2006.01) |

(52) U.S. Cl.
CPC ............ *E21B 21/003* (2013.01); *C09K 8/206* (2013.01); *C09K 8/24* (2013.01); *C09K 8/32* (2013.01); *C09K 2208/04* (2013.01)

(58) Field of Classification Search
None
See application file for complete search history.

(56) References Cited

U.S. PATENT DOCUMENTS

| 2,483,936 A | 10/1949 | Roberts |
| 2,600,404 A | 6/1952 | Hoeppel |
| 2,749,308 A | 6/1956 | Beckum et al. |
| 2,779,417 A | 1/1957 | Clark, Jr. et al. |
| 2,789,948 A | 4/1957 | Tronolone |
| 2,811,488 A | 10/1957 | Nestle et al. |
| 2,912,380 A | 11/1959 | Groves |
| 2,943,680 A | 7/1960 | Scott et al. |
| 3,147,127 A | 9/1964 | Shannon |
| 4,086,098 A | 4/1978 | Le Ruyet et al. |
| 4,127,548 A | 11/1978 | Alexander |
| 4,275,788 A | 6/1981 | Sweatman |

(Continued)

FOREIGN PATENT DOCUMENTS

| CN | 101311243 A | 11/2008 |
| CN | 101560084 A | 10/2009 |

(Continued)

OTHER PUBLICATIONS

Local palm trees support technical solutions; Saudi Aramco; Aug. 4, 2015; p. 1; http://www.saudiaramco.com/en/home/news-media/news/local-palm-trees-support.html (Year: 2015).*

(Continued)

*Primary Examiner* — Anuradha Ahuja
(74) *Attorney, Agent, or Firm* — Bracewell LLP; Constance G. Rhebergen; Brian H. Tompkins (57) ABSTRACT

A trimodal hybrid particle mix loss prevention material (LPM) is provided. The trimodal hybrid particle mix LPM includes date palm seed particles produced from date palm seeds, scrap tire particles produced from scrap tires, and date tree pruning waste particles produced from date tree pruning waste. The LCM may include date palm seed particles in the range of about 40 wt % to about 50%, scrap tire particles in the range of about 30 wt % to about 40 wt %, and date tree pruning waste particles in the range of about 15 wt % to about 25 wt %. Methods of loss prevention and manufacture of a trimodal hybrid particle mix LPM are also provided.

10 Claims, 1 Drawing Sheet

(56) References Cited

U.S. PATENT DOCUMENTS

| | | | |
|---|---|---|---|
| 4,619,772 A | 10/1986 | Black et al. | |
| 5,118,664 A | 6/1992 | Burts, Jr. | |
| 5,197,324 A | 3/1993 | Keys | |
| 5,332,724 A | 7/1994 | Burts, Jr. | |
| 5,484,028 A | 1/1996 | Rose | |
| 5,501,275 A | 3/1996 | Card et al. | |
| 5,801,127 A | 9/1998 | Duhon, Sr. | |
| 6,016,879 A | 1/2000 | Burts, Jr. | |
| 6,098,712 A | 8/2000 | Burts, Jr. | |
| 6,102,121 A | 8/2000 | Burts, Jr. | |
| 6,271,001 B1* | 8/2001 | Clarke | A61K 8/73 435/41 |
| 6,350,594 B1 | 2/2002 | Clarke et al. | |
| 6,518,224 B2 | 2/2003 | Wood | |
| 6,716,798 B1 | 4/2004 | Burts, Jr. | |
| 6,750,179 B1 | 6/2004 | Burts, Jr. | |
| 6,790,812 B2 | 9/2004 | Halliday | |
| 6,806,232 B1 | 10/2004 | Cart | |
| 6,814,798 B2 | 11/2004 | Vijn et al. | |
| 6,861,392 B2 | 3/2005 | Shaarpour | |
| 6,932,158 B2 | 8/2005 | Burts | |
| 7,226,895 B2 | 6/2007 | Xiang | |
| 7,271,131 B2 | 9/2007 | Halliday et al. | |
| 7,284,611 B2 | 10/2007 | Reddy et al. | |
| 7,297,662 B2 | 11/2007 | Verret | |
| 7,297,663 B1 | 11/2007 | Kilchrist et al. | |
| 7,332,026 B2 | 2/2008 | Fyten et al. | |
| 7,488,705 B2 | 2/2009 | Reddy et al. | |
| 7,507,692 B2 | 3/2009 | Xiang | |
| 7,537,054 B2 | 5/2009 | Reddy et al. | |
| 7,629,297 B2 | 12/2009 | Shaarpour | |
| 7,744,689 B2 | 6/2010 | Hojaji et al. | |
| 7,902,126 B1 | 3/2011 | Burts, Jr. | |
| 7,923,413 B2 | 4/2011 | Ghassemzadeh | |
| 7,964,537 B2 | 6/2011 | Rayborn, Sr. et al. | |
| 8,371,381 B2 | 2/2013 | Shindgikar et al. | |
| 8,383,558 B2 | 2/2013 | Reddy et al. | |
| 8,404,622 B2 | 3/2013 | Ghassemzadeh | |
| 8,673,825 B2 | 3/2014 | Rayborn, Sr. et al. | |
| 8,739,872 B1 | 6/2014 | Miller et al. | |
| 8,776,882 B2 | 7/2014 | Shindgikar et al. | |
| 8,887,808 B2 | 11/2014 | Kumar et al. | |
| 8,935,957 B2 | 1/2015 | Kulkarni et al. | |
| 8,992,670 B1 | 3/2015 | Vohra | |
| 9,140,118 B2 | 9/2015 | Kulkarni et al. | |
| 9,175,529 B2 | 11/2015 | Jamison et al. | |
| 9,376,607 B2 | 6/2016 | James | |
| 9,410,066 B2 | 8/2016 | Ghassemzadeh | |
| 9,416,306 B2 | 8/2016 | Savari et al. | |
| 9,453,156 B2 | 9/2016 | Wu | |
| 9,505,659 B2 | 11/2016 | Bickbau | |
| 9,592,488 B2 | 3/2017 | Yusuf et al. | |
| 9,623,067 B1 | 4/2017 | Awad et al. | |
| 9,688,901 B2 | 6/2017 | Fontenot | |
| 9,783,727 B2 | 10/2017 | Lahman et al. | |
| 2002/0010100 A1* | 1/2002 | Wood | C09K 8/035 507/100 |
| 2004/0023813 A1 | 2/2004 | Burts, III | |
| 2004/0129460 A1 | 7/2004 | MacQuoid et al. | |
| 2004/0244978 A1 | 12/2004 | Shaarpour | |
| 2005/0113260 A1 | 5/2005 | Wood | |
| 2005/0124502 A1 | 6/2005 | Shaarpour | |
| 2005/0217852 A1 | 10/2005 | Bennett et al. | |
| 2006/0106136 A1 | 5/2006 | Abu-Sharkh | |
| 2006/0122069 A1 | 6/2006 | Burts, III | |
| 2006/0157247 A1 | 7/2006 | Burts, III | |
| 2006/0160907 A1 | 7/2006 | Stamp | |
| 2009/0054269 A1 | 2/2009 | Chatterji et al. | |
| 2009/0286697 A1 | 11/2009 | Shaarpour | |
| 2009/0305038 A1 | 12/2009 | Duran et al. | |
| 2009/0305911 A1 | 12/2009 | Pomerleau | |
| 2010/0152070 A1 | 6/2010 | Ghassemzadeh | |
| 2010/0181110 A1 | 7/2010 | Harr | |
| 2010/0193244 A1* | 8/2010 | Hoskins | C09K 8/035 175/5 |
| 2010/0230164 A1 | 9/2010 | Pomerleau | |
| 2010/0230169 A1 | 9/2010 | Pomerleau | |
| 2011/0214870 A1 | 9/2011 | Shaarpour | |
| 2011/0278006 A1 | 11/2011 | Sanders | |
| 2012/0157354 A1 | 6/2012 | Li et al. | |
| 2012/0247763 A1 | 10/2012 | Rakitsky et al. | |
| 2013/0025863 A1 | 1/2013 | Lin et al. | |
| 2014/0102987 A1 | 4/2014 | Yusuf et al. | |
| 2014/0110177 A1 | 4/2014 | Harr | |
| 2014/0135237 A1 | 5/2014 | Villarreal, Jr. et al. | |
| 2014/0209290 A1 | 7/2014 | Jamison et al. | |
| 2014/0231082 A1 | 8/2014 | Jamison et al. | |
| 2014/0262281 A1 | 9/2014 | Kulkarni et al. | |
| 2014/0318793 A1 | 10/2014 | Van Petergem et al. | |
| 2014/0353043 A1 | 12/2014 | Amanullah et al. | |
| 2015/0051120 A1 | 2/2015 | Hurd et al. | |
| 2015/0166875 A1 | 6/2015 | Bird et al. | |
| 2015/0247081 A1 | 9/2015 | Dillon et al. | |
| 2015/0251156 A1 | 9/2015 | Yusuf et al. | |
| 2016/0060985 A1 | 3/2016 | Lin et al. | |
| 2016/0096988 A1 | 4/2016 | Lin et al. | |
| 2016/0177164 A1 | 6/2016 | Dillon et al. | |
| 2016/0222274 A1 | 8/2016 | Hoskins | |
| 2016/0222275 A1 | 8/2016 | Galindo et al. | |
| 2016/0257869 A1 | 9/2016 | Kulkarni et al. | |
| 2016/0264839 A1 | 9/2016 | Mata et al. | |
| 2016/0289528 A1 | 10/2016 | Wagle et al. | |
| 2016/0312100 A1 | 10/2016 | Amanullah et al. | |
| 2017/0058180 A1 | 3/2017 | Hossain et al. | |
| 2017/0137688 A1 | 5/2017 | Amanullah | |
| 2017/0166795 A1 | 6/2017 | Walker et al. | |
| 2017/0298263 A1 | 10/2017 | Amanullah | |
| 2018/0002588 A1 | 1/2018 | Amanullah | |
| 2018/0002589 A1 | 1/2018 | Amanullah | |
| 2018/0016483 A1 | 1/2018 | Amanullah | |
| 2018/0057729 A1 | 3/2018 | Amanullah | |

FOREIGN PATENT DOCUMENTS

| | | |
|---|---|---|
| CN | 101724383 A | 6/2010 |
| CN | 102127403 A | 7/2011 |
| CN | 203035080 U | 7/2013 |
| CN | 103570298 A | 2/2014 |
| CN | 103740346 A | 4/2014 |
| CN | 104087274 A | 10/2014 |
| CN | 104419392 A | 3/2015 |
| CN | 105541159 A | 5/2016 |
| GB | 2506603 A | 4/2014 |
| JP | 0671171 A | 3/1994 |
| WO | 2004013448 A2 | 2/2004 |
| WO | 2010019535 A2 | 2/2010 |
| WO | 2010088484 A2 | 8/2010 |
| WO | 2010142370 A1 | 12/2010 |
| WO | 2012037600 A1 | 3/2012 |
| WO | 2012061187 A2 | 5/2012 |
| WO | 2013039938 A1 | 3/2013 |
| WO | 2014008598 A1 | 1/2014 |
| WO | 2014197417 A1 | 12/2014 |
| WO | 2015142156 A1 | 9/2015 |
| WO | 2015199652 A1 | 12/2015 |
| WO | 2016019416 A1 | 2/2016 |
| WO | 2016028470 A1 | 2/2016 |
| WO | 2016172287 A1 | 10/2016 |
| WO | 2017087434 A1 | 5/2017 |
| WO | 2018005575 A1 | 1/2018 |

OTHER PUBLICATIONS

Alsaba, M. et al.; "Review of lost circulation materials and treatments with an updated classification." AADE National Technical Conference and Exhibition, Houston, TX, Apr. 2014; pp. 1-9.

Amanullah, et al.; "Application of an indigenous eco-friendly raw material as fluid loss additive", Journal of Petroleum Science and Engineering, vol. 139, (2016); pp. 191-197.

Amanullah; "Characteristics, behavior and performance of ARC Plug-A date seed-based sized particulate LCM." SPE Kingdom of Saudi Arabia Annual Technical Symposium and Exhibition. Society of Petroleum Engineers, 2016; pp. 1-9.

(56) References Cited

OTHER PUBLICATIONS

BakerHughes.com "Soluflake Flaked Calcium Carbonate" (XP055401101) Jan. 8, 2016; p. 1.
International Search Report and Written Opinion for International Application No. PCT/US2016/062130 (SA5410/PCT); dated Jan. 27, 2017; pp. 1-12.
International Search Report and Written Opinion for International Application No. PCT/US2017/039614 (SA5532/PCT); dated Sep. 11, 2017; pp. 1-12.
International Search Report and Written Opinion for International Application No. PCT/US2017/039616 (SA5533/PCT); dated Sep. 11, 2017; pp. 1-11.
International Search Report and Written Opinion for International Application No. PCT/US2017/047877 (SA5599/PCT); dated Oct. 27, 2017; pp. 1-15.
International Search Report and Written Opinion for International Application No. PCT/US2017/053355 (SA5580/PCT); International filing date Sep. 26, 2017; dated Jan. 17, 2018; pp. 1-14.
International Search Report and Written Opinion for International Application No. PCT/US2017/060079 (SA5577/PCT); International Filing Date Nov. 6, 2017; dated Dec. 18, 2017; pp. 1-14.
International Search Report and Written Opinion for International Application No. PCT/US2017/067179 (SA5600/PCT) International Filing Date Dec. 19, 2017; dated Feb. 21, 2018; pp. 1-14.
Wajheeuddin, M. et al.; "An experimental study on particle sizing of natural substitutes for drilling fluid applications." Journal of Nature Science and Sustainable Technology 8.2 (2014); pp. 1-14.
International Search Report and Written Opinion for International Application No. PCT/US2017/027287 (SA5508/PCT); report dated Sep. 13, 2017; 11 pages.
International Search Report and Written Opinion for International Application No. PCT/US2018/034291 (SA5652/PCT); International Filing Date May 24, 2018; Report dated Jul. 31, 2018 (pp. 1-11)
Alawad, Musaed N.J., et al.; "Superior fracture-seal material using crushed date palm seeds for oil and gas well drilling operations" Journal of King Saud University—Engineering Sciences (2017); pp. 1-7.
Al-Awad, Musaed NJ et al.; "Utilization of Shredded Waste Car Tyres as a Fracture Seal Material (FSM) in Oil and Gas Drilling Operations" Journal of Petroleum & Environmental Biotechnology, (2017) vol. 8, Issue 2; pp. 1-4.
International Search Report and Written Opinion for International Application No. PCT/US2018/048423; International Filing Date Aug. 29, 2018; Report dated Nov. 29, 2018 (pp. 1-12).

\* cited by examiner

TRIMODAL HYBRID LOSS PREVENTION MATERIAL (LPM) FOR PREVENTATIVE AND CURATIVE LOSS CONTROL

FIELD OF THE DISCLOSURE

The present disclosure generally relates to controlling lost circulation in a wellbore during drilling with a drilling fluid. More specifically, embodiments of the disclosure relate to loss prevention materials (LPM) with a trimodal particle size distribution.

DESCRIPTION OF THE RELATED ART

Loss of drilling fluid (which may include or be referred to as "lost circulation") is one of the frequent challenges encountered during drilling operations. Such fluid loss can be encountered during any stage of operations and occurs when drilling fluid (such as drilling mud) pumped into a well returns partially or does not return to the surface. While some fluid loss is expected, excessive fluid loss is not desirable from a safety, an economical, or an environmental point of view. Loss of drilling fluid is associated with problems with well control, borehole instability, pipe sticking, unsuccessful production tests, poor hydrocarbon production after well completion, and formation damage due to plugging of pores and pore throats by mud particles. In extreme cases, fluid loss problems may force abandonment of a well.

Fluid loss can occur in various formations, such as naturally fractured formations, cavernous formations, and high permeable formations. The extent of the fluid loss and the ability to prevent or control the fluid loss depends on the type of formation in which the fluid loss occurs.

SUMMARY

Various types of loss zones with potential to lose about 1 to 3 barrels/hour up to hundreds of barrels/hour are frequently encountered while drilling. These loss zones may have fluid escape paths of various shapes and sizes along with highly variable gap dimensions ranging from about 1 to 3 microns up to thousands of millimeters. Fluid loss in these loss zones may be addressed via preventative or curative approaches based on the available information of the subsurface conditions, as defined by factors such as in situ stresses acting in the vicinity of a wellbore, rock mechanical properties, status of the rock mass including the nature of the fractures (for example, open or closed), and the plugging and sealing capabilities of loss control materials. However, the use of loss control materials to prevent fluid loss before it occurs may be easier and produce improved results as compared to curing the fluid loss after it occurs.

The loss of circulation while using a conventional water-based drilling mud may have a relatively minor effect in increasing the mud and the total drilling cost due to low cost of conventional water-based muds. However, the use of more expensive high performance water-based drilling muds may increase the mud cost dramatically in the event of a loss of circulation, in addition to creating other drilling problems. Consequently, prevention of loss of circulation while drilling with a high performance water-based mud may be more desirable than curing the loss of circulation after the event occurs, as the drilling cost may increase dramatically due to the loss of costly high performance drilling muds.

Oil-based mud (OBM) is typically more expensive than water-based mud and may not be as environmentally friendly. Consequently, in addition to the increase in mud and drilling costs, the loss of oil-based mud may cause environmental damage to the surrounding areas, ecosystem, subsurface water aquifers, and other sensitive areas at a well site. Due to the cost of oil-based muds and their environmental impact, a preventive approach to fluid loss may be more desirable than a curative approach in operations using an oil-based mud system. Such approaches may need to be usable in a wide variety of subsurface conditions with different loss zone characteristics, fractures and gap sizes, in situ stresses, etc., to prevent fluid loss instead of curing the fluid loss after it occurs.

A limited number of loss prevention materials (LPMs) or blends thereof are available to prevent loss of circulation. These LPMs are typically unable to address fluid loss over a wide range of subsurface conditions associated with ruble zones, permeable areas, high permeable regions, fractured formations, and formations with a narrow mud weight window.

In one embodiment, a method to prevent lost circulation of a drilling fluid in a wellbore. The method includes introducing an altered drilling fluid into the wellbore while drilling such that a loss prevention material (LPM) contacts a loss zone, such that the altered drilling fluid includes the drilling fluid and the LPM. The LPM includes a first plurality of particles produced from date tree seeds, a second plurality of particles produced from date tree rachis, date tree leaves, or a combination thereof, and a third plurality of particles produced from scrap tires.

In some embodiments, the altered drilling fluid consists of the drilling fluid and the LPM. In some embodiments, the drilling fluid is a water-based drilling mud or an oil-based drilling mud. In some embodiments, the LPM consists of the first plurality of particles produced from date tree seeds, the second plurality of particles produced from date tree rachis, date tree leaves, or a combination thereof, and the third plurality of particles produced from scrap tires. In some embodiments, the first plurality of particles include an amount in the range of 40% by weight to 50% by weight, the second plurality of particles include an amount in the range of 30% by weight to 40% by weight, and the third plurality of particle include an amount in the range of 15% by weight to 25% by weight. In some embodiments, the LPM include a concentration of at least 15 pounds-per-barrel (ppb) in the altered drilling fluid. In some embodiments, each of the first plurality of particles produced from date tree seeds has a diameter in the range of 595 microns to 4000 microns. In some embodiments, each of the second plurality of particles produced from date tree rachis, date tree leaves, or a combination thereof, has a diameter in the range of 32 microns to 250 microns. In some embodiments, each of the second plurality of particles produced from scrap tires has a diameter in the range of 2380 microns to 8000 microns. In some embodiments, the first plurality of particles include a plurality of untreated particles produced from untreated date tree seeds. In some embodiments, the second plurality of particles include a plurality of untreated particles produced from date tree rachis, date tree leaves, or a combination thereof.

In another embodiment, an altered drilling fluid is provided. The altered drilling fluid includes a drilling fluid and a loss prevention material (LPM). The LPM includes a first plurality of particles produced from date tree seeds, a second plurality of particles produced from date tree rachis, date tree leaves, or a combination thereof, and a third plurality of particles produced from scrap tires. In some embodiments, the drilling fluid is a water-based drilling mud or an oil-based drilling mud. In some embodiments, the LPM consists of the first plurality of particles produced from date tree seeds, the second plurality of particles produced from date tree rachis, date tree leaves, or a combination thereof, and the third plurality of particles produced from scrap tires. In some embodiments, the first plurality of particles include an amount in the range of 40% by weight to 50% by weight, the second plurality of particles include an amount in the range of 30% by weight to 40% by weight, and the third plurality of particle include an amount in the range of 15% by weight to 25% by weight. In some embodiments, the LPM has a concentration of at least 15 pounds-per-barrel (ppb) in the altered drilling fluid. In some embodiments, each of the first plurality of particles produced from date tree seeds has a diameter in the range of 595 microns to 4000 microns. In some embodiments, each of the second plurality of particles produced from date tree rachis, date tree leaves, or a combination thereof, has a diameter in the range of 32 microns to 250 microns. In some embodiments, each of the second plurality of particles produced from scrap tires has a diameter in the range of 2380 microns to 8000 microns.

In another embodiment, a loss prevention material (LPM) composition is provided. The composition includes a first plurality of particles produced from date tree seeds, a second plurality of particles produced from date tree rachis, date tree leaves, or a combination thereof, and a third plurality of particles produced from scrap tires. In some embodiments, the LPM composition consists of the first plurality of particles from date tree seeds, a second plurality of particles produced from date tree rachis, date tree leaves, or a combination thereof, and the third plurality of particles produced from scrap tires. In some embodiments, the first plurality of particles include an amount in the range of 40% by weight to 50% by weight, the second plurality of particles include an amount in the range of 30% by weight to 40% by weight, and the third plurality of particle include an amount in the range of 15% by weight to 25% by weight. In some embodiments, each of the first plurality of particles produced from date tree seeds has a diameter in the range of 595 microns to 4000 microns. In some embodiments, each of the second plurality of particles produced from date tree rachis, date tree leaves, or a combination thereof, has a diameter in the range of 32 microns to 250 microns. In some embodiments, each of the second plurality of particles produced from scrap tires has a diameter in the range of 2380 microns to 8000 microns. In some embodiments, the first plurality of particles include a plurality of untreated particles produced from untreated date tree seeds. In some embodiments, the second plurality of particles include a plurality of untreated particles produced from date tree rachis, date tree leaves, or a combination thereof.

In another embodiment, a method of forming a lost prevention material (LPM) is provided. The method includes processing date tree seeds to produce a first plurality of particles, processing second plurality of particles produced from date tree rachis, date tree leaves, or a combination thereof, to produce a second plurality of particles, processing scrap tires to produce a third plurality of particles, and mixing a first amount of the first plurality of particles, a second amount of the second plurality of particles, and a third amount of the third plurality of particles to form the LPM. In some embodiments, processing the date tree seeds to produce the first plurality of particles includes grinding the date tree seeds. In some embodiments, the method includes each of the first plurality of particles has a diameter in the range of 595 microns to 4000 microns. In some embodiments, each of the second plurality of particles has a diameter in the range of 32 microns to 250 microns. In some embodiments, each of the third plurality of particles produced from scrap tires has a diameter in the range of 2380 microns to 8000 microns. In some embodiments, the first plurality of particles include an amount in the range of 40% by weight to 50% by weight, the second plurality of particles include an amount in the range of 30% by weight to 40% by weight, and the third plurality of particle include an amount in the range of 15% by weight to 25% by weight.

DETAILED DESCRIPTION

The present disclosure will be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

As a wellbore is drilled, a drilling fluid is continuously pumped into the wellbore to clear and clean the wellbore and the filings. The drilling fluid is pumped from a mud pit into the wellbore and returns again to the surface. Fluid loss, such as in a lost circulation zone, is encountered when the flow rate of the drilling fluid that returns to the surface is less than the flow rate of the drilling fluid pumped into the wellbore. It is this reduction or absence of returning drilling fluid that may be referred to as lost circulation.

Embodiments of the disclosure include a particle mix LPM (referred to as a "trimodal hybrid" particle mix LPM) that includes a mix of date palm seed particles obtained from date palm seeds, scrap tire particles obtained from scrap tires, and date tree pruning waste particles obtained from date tree pruning waste. As used in the disclosure, the term date palm seeds refers to the seeds produced from date trees (also referred to as "date palms"), such as used in the production of date fruits (also referred to as "dates"). The trimodal hybrid particle mix LPM may mitigate or prevent fluid loss (that is, loss of drilling fluid) during drilling of a well. In some embodiments, the trimodal hybrid particle mix may be used as a lost circulation material (LCM) to cure fluid loss after it occurs in a lost circulation zone.

With the foregoing in mind, a trimodal hybrid particle mix LPM may include particles formed from ground date tree seeds, particles formed from ground scrap tires, and particles formed from date tree pruning waste. In some embodiments, the particles formed from ground scrap tires may include crumb rubber. In such embodiments, the particles formed from ground scrap tires may be Grade I crumb rubber. In some embodiments, the trimodal hybrid particle mix LPM may include date palm seed particles in the range of about 45% by weight (wt %) to about 50 wt %, scrap tire particles in the range of about 30 wt % to about 40 wt %, and date tree pruning waste particles in the range of about 15 wt % to about 25 wt %. In some embodiments, the trimodal hybrid particle mix LPM includes 45 wt % date palm seed particles, 35 wt % scrap tire particles, and 20 wt % date tree pruning waste particles. In some embodiments, the resulting trimodal hybrid particle mix LPM may have a trimodal particle size distribution.

The presence of three types of particles with different properties may enable the trimodal hybrid particle mix LPM to be usable in a wide range of subsurface conditions associated with drilling fluid loss, such as ruble zones, permeable regions, fractured formations, and formations having a narrow mud weight window. The trimodal hybrid particle mix LPM may form a structure (for example, a seal or plug) in subsurface conditions that adapts when in situ conditions change with changing wellbore conditions. For example, the date palm seed particles may be more rigid as compared to the scrap tire particles, while the scrap tire particles may be more ductile, malleable, and resilient as compared to the date palm seed particles. The date tree pruning waste particles may be smaller and more fibrous than the date palm seed particles and the scrap tire particles. The combination of three particles in the trimodal hybrid particle mix LPM mix may enable the in situ formation of a seal or plug that has improved malleability, ductility, and resiliency as compared to existing fluid loss additives.

Trimodal Hybrid Particle Mix LPM Manufacture and Use

In some embodiments, a trimodal hybrid particle mix LPM includes date palm seed particles, scrap tire particles, and date tree pruning waste particles. The date palm seed particles include particles manufactured from date palm seeds. The date palm seeds may be obtained from date processing plants to provide a sustainable source of material for the trimodal hybrid particle mix LPM. Moreover, local sources of date tree waste may reduce the cost of imported LPM products, components, or both. The date palm seeds may be obtained from the species *phoenix dactylifera*. It should be appreciated that, in some embodiments, the date palm seeds may be obtained from genetically modified date trees (that is, genetically modified organisms (GMOs)). In some embodiments, the date palm seeds may be prepared by cleaning the date palm seeds before use or processing, such as by washing the date palm seeds.

The scrap tire particles may be obtained from scrap tires (also referred to as "waste tires"). The scrap tires may be obtained from tire recycling facilities, tire disposal locations, and the like. The scrap tires may be shredded and ground to produce the scrap tire particles. In some embodiments, the scrap tire particles may be produced without any magnetic separation. In some embodiments, unwanted components (for example, metallic components) may be separated from the scrap tires during processing (for example, via a magnetic separator). In some embodiments, the particles formed from scrap tires may include crumb rubber, such as Grade I crumb rubber.

The date tree pruning waste may include particles formed from the waste generated from date tree pruning and may provide an additional sustainable source of material for the trimodal hybrid particle mix LPM. The date tree pruning waste may include, for example, date tree rachis and date tree leaves, such that the LPM includes particles formed from date tree rachis, date tree leaves, or a combination thereof. Similar to the date tree seed particles, the use of locally obtained date tree pruning waste may reduce the cost of imported LPM products, components, or both. The date tree pruning waste may be obtained from the species *phoenix dactylifera*. It should be appreciated that, in some embodiments, the date tree pruning waste may be obtained from genetically modified date trees (that is, genetically modified organisms (GMOs)). In some embodiments, the date tree pruning waste may be prepared by cleaning the date tree pruning waste before use or processing, such as by washing the date tree pruning waste.

In some embodiments, the date palm seed particles may include particles having the following particle size distribution, as determined by the diameters of the particles passed or retained in mesh openings: about 4000 microns (μm) to about 2380 microns (for example, particles passing through sieve mesh size no. 5 and retained in sieve mesh size no. 8), about 2380 microns to about 1190 microns (for example, particles passing through sieve mesh size no. 8 and retained in sieve mesh size no. 16), and about 1190 microns to about 595 microns (for example, particles passing through sieve mesh size no. 16 and retained in sieve mesh size no. 35).

In some embodiments, the scrap tire particles may include particles having the following particle size distribution, as determined by the diameters of the particles passed or retained in mesh openings: about 8000 microns to 4000 microns (for example, particles passing through sieve mesh size no. 5/16 inch and retained in sieve mesh size no. 5) and about 4000 microns to about 2830 microns (for example, particles passing through sieve mesh size no. 5 and retained in sieve mesh size no. 8).

In some embodiments, the date tree pruning waste particles may include particles having the following particle size distribution, as determined by the diameters of the particles passed or retained in mesh openings: about 250 microns to 75 microns (for example, particles passing through sieve mesh size no. 60 and retained in sieve mesh size no. 200) and about 75 microns to about 32 microns (for example, particles passing through sieve mesh size no. 200 and retained in sieve mesh size no. 450).

In some embodiments, the trimodal hybrid particle mix LPM may include date palm seed particles in the range of about 40% by weight (wt %) to about 50 wt %, scrap tire particles in the range of about 30 wt % to about 40 wt %, and date tree pruning waste particles in the range of about 15 wt % to about 25 wt %. In some embodiments, the trimodal hybrid particle mix LPM may include about 45 wt % date palm seed particles, about 35 wt % scrap tire particles, and about 20 wt % date tree pruning waste particles.

In some embodiments, the date palm seeds may include untreated date palm seeds and the date tree pruning waste particles may include untreated date tree pruning waste. As used in the disclosure, the term "untreated" or "without treating" refers to not treated with alkali or acid, not bleached, not chemically altered, not oxidized, and without any extraction or reaction process other than possibly drying of water. The term "untreated" or "without treatments" does not encompass grinding or heating to remove moisture but does encompass chemical or other processes that may change the characteristics or properties of the particles. In such embodiments, the date palm seed particles and date tree pruning waste particles may be manufactured without treating before, during, or after crushing, grinding, drying, or any other processing.

The trimodal hybrid particle mix LPM may be added to a drilling fluid, such as a drilling mud, to create an altered drilling fluid having the trimodal hybrid particle mix LPM. For example, in some embodiments, the trimodal hybrid particle mix LPM may be added to (for example, blended with) an oil-based drilling mud or a water-based drilling mud. In some embodiments, the trimodal hybrid particle mix LPM may be added at the mud pit of a mud system. In some embodiments, the trimodal hybrid particle mix LPM may be added to a drilling fluid in an amount in the range of about 15 parts-per-billion mass (ppb) to about 30 ppb. After addition of the trimodal hybrid particle mix LPM to a drilling fluid, drilling operations may begin or resume by using the altered drilling fluid with the trimodal hybrid particle mix LPM during drilling. For example, while a well is drilled and drilling fluid is circulated downhole in the wellbore, the trimodal hybrid particle mix LPM may enter and block porous and permeable paths, cracks, and fractures in a formation accessed by the wellbore, such that a structure (for example, a plug or seal) forms in the paths, cracks, and fractures to prevent loss of the drilling fluid during drilling operations.

Figure 1:
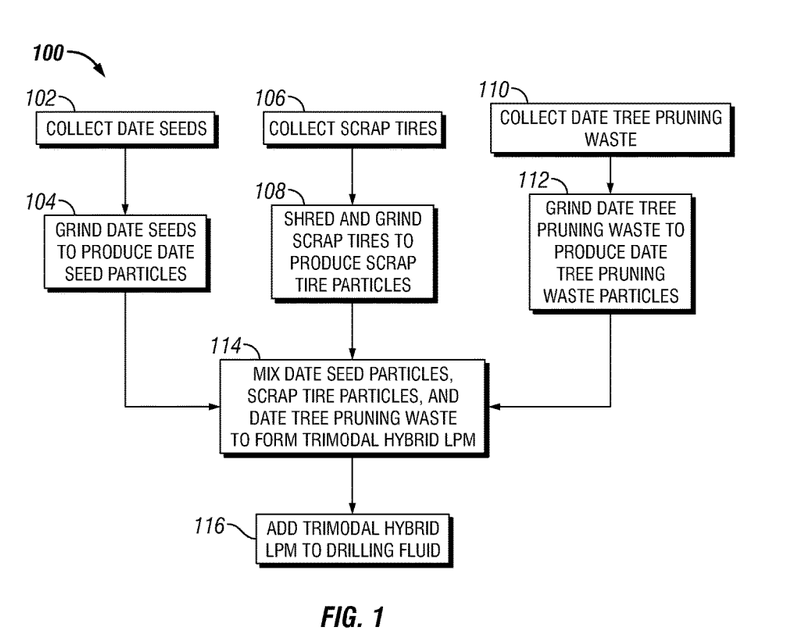
FIG. 1 is a process for the production and use of a trimodal hybrid particle mix LPM formed from date palm seed particles, scrap tire particles, and date tree pruning waste in accordance with an embodiment of the disclosure.

FIG. 1 depicts a process 100 for the production and use of a trimodal hybrid particle mix LPM in accordance with an example embodiment of the disclosure. As shown in FIG. 1, date tree seeds may be collected (block 102), such as from date tree waste produced by date tree farming and date processing industries. In some embodiments the date palm seeds may be cleaned, such as by a high pressure water or air jet, to remove dirt, dust, and other foreign substances. The collected date palm seeds may be ground to produce particles from the date palm seeds (block 104). In some embodiments, the collected date palm seeds may be ground using a suitable commercial grinder that produces a specific range of particle sizes (for example, diameter).

As also shown in FIG. 1, scrap tires may be collected, such as from tire recycling facilities or tire disposal locations (block 106). In some embodiments, tires may be collected and transported to another facility for processing as described in the disclosure. In some embodiments the tires may be cleaned, such as by a high pressure water or air jet, to remove dirt, dust, and other foreign substances. The collected tires may be shredded and ground to produce particles from the scrap tires (block 108). In some embodiments, the collected scrap tires may be ground using a suitable commercial grinder that produces a specific range of particle sizes (for example, diameter). In some embodiments, unwanted components (for example, metallic components) may be separated from the scrap tires during processing (for example, via a magnetic separator).

Additionally, date tree pruning waste may be collected (block 110), such as from waste produced by pruning in date tree farming. The date tree pruning waste may include date tree leaves and date tree rachis. In some embodiments the date tree pruning waste may be cleaned, such as by a high pressure water or air jet, to remove dirt, dust, and other foreign substances. The collected date tree pruning waste may be ground to produce particles from the date tree pruning waste (block 112). For example, the particles may include particles formed from date tree rachis, date tree leaves, or a combination thereof. In some embodiments, the collected date tree pruning waste may be ground using a suitable commercial grinder that produces a specific range of particle sizes (for example, diameter).

The date palm seed particles, the scrap tire particles, and date tree pruning waste particles may then be mixed to form a trimodal hybrid particle mix LPM having all three types of particles (block 114). In some embodiments, the mix of date palm seed particles, the scrap tire particles, and date tree pruning waste particles may be packed for transportation and use. In some embodiments, a suitable amount of packed trimodal hybrid particle mix may then be transported to an oil and gas operations site for use as an LPM.

The trimodal hybrid particle mix LPM may be added directly to a drilling fluid (block 116), such as a drilling mud, to create an altered drilling fluid having the trimodal hybrid particle mix LPM. For example, in some embodiments, the trimodal hybrid particle mix LPM may be added to (for example, blended with) an oil-based drilling mud or a water-based drilling mud. In some embodiments, the trimodal hybrid particle mix LPM may be added at the mud pit of a mud system. After addition of the trimodal hybrid particle mix LPM to a drilling fluid, drilling operations may begin or resume by using the altered drilling fluid with the trimodal hybrid particle mix LPM during drilling. For example, while a well is drilled and drilling fluid is circulated downhole in the wellbore, the trimodal hybrid particle mix LPM may prevent fluid loss through porous and permeable paths, cracks, and fractures in a formation accessed by the wellbore. The LPM in the drilling fluid may form structures (for example, a plug or seal) in the paths, cracks, and fractures or openings thereof to prevent loss of the drilling fluid during drilling operations. In some embodiments, the trimodal LPM may prevent the loss of any drilling fluid during drilling (such that the rate of fluid loss is equal to zero). Advantageously, the trimodal hybrid particle mix LPM may prevent the loss of drilling fluid in loss zones before the occurrence of any fluid loss. In some embodiments, the trimodal hybrid particle mix LPM may only consist of the date palm seed particles, the scrap tire particles, and date tree pruning waste particles without any other fluid loss additives, activators, or other components. In other embodiments, the trimodal hybrid particle mix LPM may be combined with other fluid loss additive and then may be added to a drilling fluid, such as a drilling mud, to create an altered drilling fluid having the LPM and other fluid loss additives.

In some embodiments, the trimodal hybrid particle mix may be used as a lost circulation material (LCM) to mitigate or stop lost circulation in lost circulation zones. In such embodiments, the trimodal hybrid particle LCM may be added directly to a drilling fluid, such as a drilling mud, to create an altered drilling fluid having the trimodal hybrid particle LCM. After addition of the trimodal hybrid particle LCM to a drilling fluid, the altered drilling fluid may be circulated at a pump rate effective to position the altered drilling fluid into contact with a lost circulation zone in a wellbore, such that the trimodal hybrid particle LCM alters the lost circulation zone (for example, by entering and blocking porous and permeable paths, cracks, and fractures in a formation in the lost circulation zone, such as forming a structure (for example, a plug or seal) in a mouth or within a fracture). In some embodiments, the hybrid particle mix LCM may be mixed with a carrier fluid, a viscosifier, or both. In some embodiments, a trimodal hybrid particle LCM homogenous suspension or fluid pill may be formed. For example, a specific carrier fluid, viscosifier, or combination thereof may be selected to form a homogenous suspension or fluid pill with the trimodal hybrid particle LCM. The homogenous suspension or pill may be added to a drilling fluid and used in the manner similar to the trimodal hybrid particle LCM described in the disclosure.

Examples

The following examples are included to demonstrate embodiments of the disclosure. It should be appreciated by those of skill in the art that the techniques and compositions disclosed in the example which follows represents techniques and compositions discovered to function well in the practice of the disclosure, and thus can be considered to constitute modes for its practice. However, those of skill in the art should, in light of the present disclosure, appreciate that many changes can be made in the specific embodiments which are disclosed and still obtain a like or a similar result without departing from the spirit and scope of the disclosure.

The following non-limiting examples of a trimodal hybrid particle mix LPM were prepared and tested using a 65 pounds per cubic foot (pcf) bentonite mud. Additionally, non-limiting examples of a trimodal hybrid particle mix LPM were prepared and evaluated against a bimodal LPM formed from date palm seed particles and scrap tire particles, and a commercial lost circulation material (LCM) blend.

The example trimodal hybrid particle mix LPM was prepared by combining 45% by weight date palm seed particles having sizes in the range of greater than 595 microns to less than 4000 microns, 35% scrap tire particles having sizes in the range of greater than 2830 microns and less than 8000 microns, and 20% date tree pruning waste fibers having sizes in the range of greater than 32 microns and less than 250 microns. The date palm seed particles, scrap tire particles, and date tree pruning waste fibers were mixed together using a low shear mixing apparatus to form a homogenous mix of particles while maintaining the particle size distribution without damaging or degrading the particles.

The date palm seed particles of the example trimodal hybrid particle mix LPM had the following particle size distribution (PSD), as determined by the diameters of the particles passed or retained in mesh openings: about 3999 microns (μm) to about 2380 microns (for example, particles passing through sieve mesh size no. 5 and retained in sieve mesh size no. 8), about 2380 microns to about 1190 microns (for example, particles passing through sieve mesh size no. 8 and retained in sieve mesh size no. 16), and about 1190 microns to about 595 microns (for example, particles passing through sieve mesh size no. 16 and retained in sieve mesh size no. 35).

The scrap tire particles of the example trimodal hybrid particle mix LPM had the following particle size distribution (PSD), as determined by the diameters of the particles passed or retained in mesh openings: about 7999 microns to 4000 microns (for example, particles passing through sieve mesh size no. 5/16 inch and retained in sieve mesh size no. 5) and about 4000 microns to about 2380 microns (for example, particles passing through sieve mesh size no. 5 and retained in sieve mesh size no. 8).

The date tree pruning waste fibers of the example trimodal hybrid particle mix LPM had the following particle size distribution (PSD), as determined by the diameters of the particles passed or retained in mesh openings: about 249 microns to 75 microns (for example, particles passing through sieve mesh size no. 60 and retained in sieve mesh size no. 200) and about 75 microns to about 32 microns (for example, particles passing through sieve mesh size no. 200 and retained in sieve mesh size no. 450).

Table 1 depicts the composition of the example trimodal hybrid particle mix LPM and the size ranges and amounts of the components:

TABLE 1

COMPOSITION OF THE EXAMPLE TRIMODAL HYBRID PARTICLE MIX LPM

| Component | Size Range (microns) Differential Mass (grams(g)) | | Amount by weight | | Average Mass (g) |
|---|---|---|---|---|---|
| | | | Average (%) | % Range | |
| Date Seed Particles | 4000+ | 0 | 45 | 40-50 | 0 |
| | 2380+ | 70.75 | | | 32 |

TABLE 1-continued

COMPOSITION OF THE EXAMPLE TRIMODAL HYBRID PARTICLE MIX LPM

| Component | Size Range (microns) Differential Mass (grams(g)) | | Amount by weight | | Average Mass (g) |
|---|---|---|---|---|---|
| | | | Average (%) | % Range | |
| | 1190+ | 24.71 | | | 11 |
| | 595+ | 4.53 | | | 2 |
| | Total | 100 | | | 45 |
| Scrap Tire Particles | 8000+ | 0 | 35 | 30-40 | 0 |
| | 4000+ | 23.00 | | | 8 |
| | 2830+ | 77.00 | | | 27 |
| | Total | 100 | | | 35 |
| Date Fiber Particles | 250+ | 0 | 20 | 15-25 | 0 |
| | 75+ | 79.13 | | | 16 |
| | 32+ | 20.87 | | | 4 |
| | Total | 100.00 | | | 20 |

Figure 2:
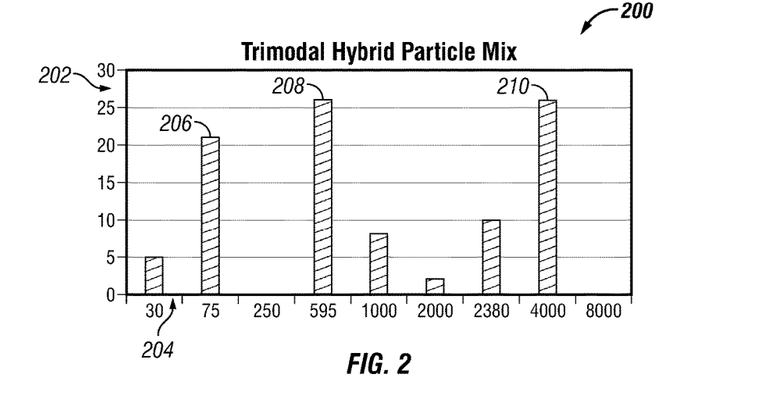
FIG. 2 is a bar graph of the particle size distribution of an example trimodal hybrid particle mix in accordance with an embodiment of the disclosure.

The example trimodal hybrid particle mix LPM prepared from the date palm seed particles, scrap tire particles, and date tree pruning waste particles with the described particle size distributions had a trimodal particle size distribution. FIG. 2 is a bar graph 200 of the particle size distribution of the example trimodal hybrid particle mix in accordance with an embodiment of the disclosure. As shown in FIG. 2, the y-axis 202 depicts the differential % of particles retained and the x-axis 204 depicts the particle size (in microns). The particle size distribution shown in FIG. 2 illustrates a trimodal particle size distribution a first mode (illustrated by bar 206) at about 75 microns, a second mode (illustrated by bar 208) at about 595 microns, and a third mode (illustrated by bar 210) at about 4000 microns.

The sealing and plugging capability of the trimodal hybrid particle mix LPM was evaluated using a 2 millimeter (mm) slotted disc and a Permeability Plugging Tester (also referred to as "PPT" or "Pore Plugging Test" apparatus) manufactured by OFI Testing Equipment, Inc., of Houston, Tex., USA. The tests were conducted at conditions of about 212° F. and about 500 psi differential pressure. For the plugging efficiency tests, the hybrid particle mix formulation was incorporated into a 65 pounds per cubic foot (pcf) bentonite mud. The composition of the 65 pcf bentonite mud with mud components expressed in pounds-per-barrels (lb/bbl) is shown in Table 3:

TABLE 2

COMPOSITION OF 65 PCF BENTONITE MUD

| Mud Component | lb/bbl |
|---|---|
| Water | 340.67 |
| Bentonite | 25.00 |
| Caustic Soda | 0.25 |
| Soda Ash | 0.25 |

The test was conducted using the Permeability Plugging Tester apparatus and the following plugging efficiency test procedure:

1. Set the temperature controller/thermostat to the testing temperature;

2. Check the condition of the O-rings in the groove at the top of the test cell of the Permeability Plugging Tester apparatus and in the cell end cap and replace the O-rings if needed;

3. Apply a thin coating of high temperature grease to all the O-rings, including the two O-rings on the piston of the Permeability Plugging Tester apparatus;

4. Screw the T-bar of the Permeability Plugging Tester apparatus into the piston, install into the bottom end of the test cell, position the piston about 1 inch into the cell bore, and remove the T-bar;

5. Add a volume of hydraulic oil to the test cell using the hydraulic hand pump of the Permeability Plugging Tester apparatus;

6. Install all the O-rings and secure the end cap of the cell in position such that oil flows from the hole in the end cap to ensure no air is trapped;

7. Install the valve stem into the bottom end cap of the cell, tighten the valve stem, and disconnect from the hydraulic hand pump of the Permeability Plugging Tester apparatus;

8. Place the cell upright on a suitable stand;

9. Pour a test sample of a homogenous mixture of 275 ml of the 65 pcf bentonite mud and 30 grams of an LPM or LCM into the test cell;

10. Install an O-ring into the top of the cell below the 2 mm slotted disc;

11. Place the 2 mm slotted disc on top of the O-ring;

12. Insert the end cap on the top of the disc, screw down the threaded retaining ring, and fully tighten;

13. Tighten the top stem of the test cell;

14. Place the cell into the heating jacket of the Permeability Plugging Tester apparatus;

15. Connect a pressure hose from the hydraulic hand pump to the bottom of the test cell via a quick connector and ensure the bottom stem is closed;

16. Connect the back pressure hose/sample collector to the top stem of the test cell, ensuring that the locking pin is in place, close the pressure relief valve on the side of the hydraulic hand pump, apply the testing pressure via the back pressure regulator to the top of the test cell, and close the top valve.

17. Place a thermometer into the hole at the top of the test cell. wait until the testing temperature is reached, and monitor the cell pressure while heating and bleed off pressure if necessary by opening the pressure relived valve on the side of the hydraulic hand pump;

18. Once the test sample has reached the testing temperature, pump the hydraulic hand pump until the pump gauge shows the testing pressure plus the required back pressure;

19. Apply the required back pressure to the top of the cell, open the top valve, and pump the hydraulic hand pump to reestablish the testing pressure;

20. To determine the spurt volume, collect the fluid from the back pressure collector in a measuring cylinder and record the amount, ensuring that all the fluid has been expelled;

21. Collect the fluid periodically over a 30 minute time period and check the back pressure gauge to ensure that the pressure remains less than the pressure threshold (about 3000 psi) of the built-in safety disc of the Permeability Plugging Tester apparatus and avoid expulsion of hot hydraulic oil;

22. Record the spurt loss, total leak off, and PPT values over the 30 minute time period and record the cake thickness after dismantling the test cell.

Table 3 shows the results of plugging efficiency tests for the trimodal hybrid particle mix LPM at 17.5 pounds-per-barrel (ppb) and 15 ppb concentrations in the 65 pcf bentonite mud, with the spurt loss, fluid loss, total leak off, and PPT value measured in cubic centimeters (cc) and the cake thickness measured in mm:

TABLE 3

PLUGGING EFFICIENCY TEST RESULTS FOR TRIMODAL HYBRID PARTICLE MIX LPM

| Mud System | LPM | Concentration | Spurt Loss | Fluid Loss | Total Leak-off | Cake Thickness | PPT Value |
|---|---|---|---|---|---|---|---|
| 65 pcf Bentonite Mud | Trimodal Hybrid | 17.5 ppb | 0 | 0 | 0 | N/A | 0 |
| 65 pcf Bentonite Mud | Trimodal Hybrid | 15 ppb | 1 | 0 | 1 | N/A | 2 |

As shown in Table 3, at a concentration of 15 ppb, the trimodal hybrid particle mix LPM exhibited minimal spurt loss, zero fluid loss, and minimal leak off. However, at a slightly greater concentration of 17.5 ppb, the trimodal hybrid particle mix LPM exhibited zero spurt loss, zero fluid loss, and zero leak off, thus illustrating the capability of the trimodal hybrid particle mix LPM to prevent fluid loss when added to a drilling fluid.

The sealing and plugging capability of the trimodal hybrid particle mix LPM was evaluated against a "bimodal LPM" using the 2 millimeter (mm) slotted disc and the PPT apparatus, according to the test procedure described supra. The tests were conducted at conditions of about 212° F. and about 500 psi differential pressure.

The bimodal LPM used in the test was prepared by combining 64% by weight date palm seed particles and 35% by weight scrap tire particles. The date palm seed particles in the bimodal LPM had the following particle size distribution (PSD), as determined by the diameters of the particles passed or retained in mesh openings: about 4000 microns (μm) to about 2000 microns (that is, particles passing through sieve mesh size no. 5 and retained in sieve mesh size no. 10), about 2000 microns to about 1000 microns (that is, particles passing through sieve mesh size no. 10 and retained in sieve mesh size no. 18), and about 1000 microns to about 500 microns (that is, particles passing through sieve mesh size no. 18 and retained in sieve mesh size no. 35). The scrap tire particles in the bimodal LPM had the following particle size distribution (PSD), as determined by the diameters of the particles passed or retained in mesh openings: about 8000 microns to 4000 microns (that is, particles passing through sieve mesh size no. 5/16 and retained in sieve mesh size no. 5) and about 4000 microns to about 2000 microns (that is, particles passing through sieve mesh size no. 5 and retained in sieve mesh size no. 10).

For the plugging efficiency tests, the trimodal hybrid particle mix LPM and the bimodal LPM were incorporated into a 65 pounds per cubic foot (pcf) bentonite mud having the composition described in Table 2. Table 4 shows the results of plugging efficiency tests for the trimodal hybrid particle mix LPM and bimodal LPM at 20 ppb in the 65 pcf bentonite mud, with the spurt loss, fluid loss, total leak off, and PPT value measured in cubic centimeters (cc) and the cake thickness measured in mm:

TABLE 4

PLUGGING EFFICIENCY TEST RESULTS FOR TRIMODAL
HYBRID PARTICLE MIX LPM AND BIMODAL LPM

| Mud System | LPM | Concentration | Spurt Loss | Fluid Loss | Total Leak-off | Cake Thickness | PPT Value |
|---|---|---|---|---|---|---|---|
| 65 pcf Bentonite Mud | Bimodal | 20 ppb | 9 | 0 | 9 | N/A | 18 |
| 65 pcf Bentonite Mud | Trimodal Hybrid | 20 ppb | 0 | 0 | 0 | N/A | 0 |

As shown in Table 4, at 20 ppb concentrations, the trimodal hybrid particle mix LPM showed better performance than the bimodal LPM and exhibited zero spurt loss, zero fluid loss, and zero leak off.

The sealing and plugging capability of the trimodal hybrid particle mix LPM was also evaluated against a commercial LCM blend, SOLU-SEAL™ manufactured by Drilchem of Jakarta, Indonesia. The trimodal hybrid particle mix LPM and commercial LCM blend were testing using a 2 millimeter (mm) slotted disc and the PPT apparatus according to the test procedure described supra. The tests were conducted at conditions of about 212° F. and about 500 psi differential pressure.

For the plugging efficiency tests, the trimodal hybrid particle mix LPM and the commercial blend LCM were incorporated into the 65 pounds per cubic foot (pcf) bentonite mud having the composition described in Table 2. Table 5 shows the results of plugging efficiency tests for the trimodal hybrid particle mix LPM and bimodal LPM at 20 ppb in the 65 pcf bentonite mud, with the spurt loss, fluid loss, total leak off, and PPT value measured in cubic centimeters (cc) and the cake thickness measured in mm:

TABLE 5

PLUGGING EFFICIENCY TEST RESULTS FOR TRIMODAL
HYBRID PARTICLE MIX LPM AND COMMERCIAL LCM BLEND

| Mud System | LPM | Concentration | Spurt Loss | Fluid Loss | Total Leak-off | Cake Thickness | PPT Value |
|---|---|---|---|---|---|---|---|
| 65 pcf Bentonite Mud | Trimodal Hybrid | 20 ppb | 0 | 0 | 0 | N/A | 0 |
| 65 pcf Bentonite Mud | Commercial LCM Blend | 20 ppb | 0 | 2 | 2 | 6.35 | 4 |

As shown in Table 4, at 20 ppb concentrations, the trimodal hybrid particle mix LPM showed better performance than the commercial LCM blend and exhibited improved fluid loss and leak off characteristics.

As shown supra, the trimodal hybrid particle mix LPM showed plugging and sealing capabilities at various concentrations. For example, at concentrations of at least 17.5 ppb, the trimodal hybrid particle mix LPM exhibited zero spurt loss and fluid loss due to the instantaneous formation of seals in the slots of the metal disc of the PPT apparatus. At a concentration of 15 ppb, the trimodal hybrid particle mix LPM showed negligible sport less and demonstrated sealing and plugging capability at this lesser concentration. At greater concentrations of 20 ppb, the trimodal hybrid particle mix LPM demonstrated greater plugging and sealing performance than a bimodal LPM and a commercial LCM blend.

Ranges may be expressed in the disclosure as from about one particular value, to about another particular value, or both. When such a range is expressed, it is to be understood that another embodiment is from the one particular value, to the other particular value, or both, along with all combinations within said range.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used described in the disclosure are for organizational purposes only and are not meant to be used to limit the scope of the description.

What is claimed is:

1. A method to prevent lost circulation of a drilling fluid in a wellbore, comprising:
   introducing an altered drilling fluid into the wellbore while drilling such that a loss prevention material (LPM) contacts a loss zone, wherein the altered drilling fluid comprises the drilling fluid and the LPM, wherein the LPM consists of:
   a first plurality of particles produced from date tree seeds;
   a second plurality of particles produced from date tree rachis, date tree leaves, or a combination thereof, and
   a third plurality of particles produced from scrap tires;
   blocking the loss zone with the LPM and thereby preventing lost circulation of the drilling fluid in the wellbore.

2. The method of claim 1, wherein the altered drilling fluid consists of the drilling fluid and the LPM.

3. The method of claim 1, wherein the drilling fluid comprises a water-based drilling mud or an oil-based drilling mud.

4. The method of claim 1, wherein the LPM consists of the first plurality of particles in an amount in the range of 40% by weight to 50% by weight, the second plurality of particles in an amount in the range of 30% by weight to 40% by weight, and the third plurality of particles in an amount in the range of 15% by weight to 25% by weight.

5. The method of claim 1, wherein the LPM comprises a concentration of at least 15 pounds-per-barrel (ppb) in the altered drilling fluid.

6. The method of claim 1, wherein each of the first plurality of particles produced from date tree seeds has a diameter in the range of 595 microns to 4000 microns.

7. The method of claim 1, wherein each of the second plurality of particles produced from date tree rachis, date tree leaves, or a combination thereof, has a diameter in the range of 32 microns to 250 microns.

8. The method of claim 1, wherein each of the third plurality of particles produced from scrap tires has a diameter in the range of 2380 microns to 8000 microns.

9. The method of claim 1, wherein the first plurality of particles comprise a plurality of untreated particles produced from untreated date tree seeds.

10. The method of claim 1, wherein the second plurality of particles comprise a plurality of untreated particles produced from date tree rachis, date tree leaves, or a combination thereof.

* * * * *